United States Patent
Kallie

(10) Patent No.: US 9,515,468 B2
(45) Date of Patent: Dec. 6, 2016

(54) STRENGTHENING ADAPTER FOR AN ELECTRICAL BOX AND METHOD

(71) Applicant: Peter John Kallie, Naples, FL (US)

(72) Inventor: Peter John Kallie, Naples, FL (US)

( * ) Notice: Subject to any disclaimer, the term of this patent is extended or adjusted under 35 U.S.C. 154(b) by 284 days.

(21) Appl. No.: 14/200,161

(22) Filed: Mar. 7, 2014

(65) Prior Publication Data

US 2015/0255970 A1     Sep. 10, 2015

(51) Int. Cl.
*H02G 3/14* (2006.01)
*H02G 3/12* (2006.01)

(52) U.S. Cl.
CPC ......... *H02G 3/121* (2013.01); *Y10T 29/49963* (2015.01)

(58) Field of Classification Search
CPC ............ H02G 3/14; H02G 3/08; H02G 3/081; H02G 3/121; H02G 3/126; H02G 3/18; H02G 3/086; H02G 3/12; H02G 3/123; Y10T 29/49963
USPC ........... 174/480, 481, 50, 53, 57, 58, 66, 67; 220/3.2–3.9, 4.02, 241, 242; 248/906
See application file for complete search history.

(56) References Cited

U.S. PATENT DOCUMENTS

| | | | | |
|---|---|---|---|---|
| 4,134,636 A * | 1/1979 | Kleinatland | ........... | H02G 3/123 174/58 |
| 4,998,635 A * | 3/1991 | Vink | ........ | H02G 3/18 248/906 |
| 6,204,447 B1 * | 3/2001 | Gretz | ........ | H02G 3/121 174/50 |
| 6,750,398 B1 * | 6/2004 | Richardson | ............ | H02G 3/14 174/50 |
| 7,122,740 B2 * | 10/2006 | Xu | ........... | H02G 3/14 174/66 |
| 7,235,739 B2 * | 6/2007 | King, Jr. | ............... | H02G 3/086 174/480 |
| 7,531,743 B2 * | 5/2009 | Johnson | ................ | H02G 3/081 174/53 |
| 7,789,257 B2 * | 9/2010 | Davis | .................... | H02G 3/123 174/58 |
| 8,013,243 B2 * | 9/2011 | Korcz | .................... | H02G 3/126 174/481 |
| 8,109,401 B2 * | 2/2012 | Davis | .................... | H02G 3/123 220/3.2 |
| 8,575,484 B1 * | 11/2013 | Witherbee | ............. | H02G 3/126 174/50 |
| 8,702,446 B2 * | 4/2014 | Gonzalez | ................ | H02G 3/14 439/535 |
| 8,835,764 B2 * | 9/2014 | Seff | ......... | H02G 3/14 174/66 |
| 8,933,331 B1 * | 1/2015 | Gretz | .................... | H02G 3/121 174/50 |
| 9,209,611 B2 * | 12/2015 | Gagne | .................... | H02G 3/14 |

* cited by examiner

*Primary Examiner* — Angel R Estrada
(74) *Attorney, Agent, or Firm* — Ronald C Capossela

(57) ABSTRACT

This invention is directed to a strengthening adapter 7 for securing a standard electrical device 4 such as a switch or female receptacle within a standard electrical box 3 positioned within a space 5 in drywall 2 by sandwiching the strengthening adapter 7 between electrical device 4 and the drywall and at the same time covering any space 5 in the drywall 2 around the electrical box 3.

7 Claims, 2 Drawing Sheets

STRENGTHENING ADAPTER FOR AN ELECTRICAL BOX AND METHOD

CROSS REFERENCE TO RELATED APPLICATIONS

None

FEDERALLY SPONSORED RESEARCH

None

SEQUENCE LISTING

None

BACKGROUND OF THE INVENTION

Field of the Invention

This invention relates to a strengthening adapter for securing an electric device to an electrical box positioned in a wall made of drywall in such a manner which rigidly secures the electrical device to the electrical box and covers any objection spaces in the drywall in close proximity to the electrical box. The electrical device can be a switch, a female receptacle, a CATV coax wire, telephone wire or any other component requiring secure attachment to a drywall environment.

Description of the Related Prior Art

There has long been a need in the art for an inexpensive device to rigidly secure an electrical device to an electrical box and at the same time cover any spaces in the drywall immediately surrounding the electrical box. In many instances when the electrician connects the electrical box to the stud inside the wall it is often loose and can lead to arcing and a fire. Many attempts have been made to fix loose electrical devices such as switches and receptacle. Many attempts have been made to cover spaces around electrical boxes.

U.S. Pat. No. 7,582,830 (2009) to Claffy shows an oversized decorative plate to cover the electrical box and the gaps in the drywall.

U.S. Pat. No. 7,303,802 (2007) to Brower et al and U.S. Pat. No. 6,627,292 (2003) to Hoffmann, Jr. discloses various methods of patching drywall around an electrical box.

None of the aforementioned U.S. Patents deal with the aspect of rigidly securing an electrical device to the electrical box and covering any spaces in the drywall immediately around the electrical box.

SUMMARY OF THE INVENTION

The following presents a simplified summary of the invention in order to provide a basic understanding of some aspects of the invention.

The present invention is directed to overcoming the problems set forth above.

The primary object of the present invention is to provide a strengthening adapter and method for forcibly sandwiching the strengthening adapter between a standard electrical device and the drywall when the electrical device is screwed into a standard electrical box behind existing drywall.

Another object of the present invention is to provide a strengthening adapter and method for mounting a standard electrical box behind existing drywall without having to secure the electrical box to a stud.

A further object of the present invention is to provide a strengthening adapter for securing an electrical box to the drywall which has become loose over time.

A further object of the present invention is to provide an oversized strengthening adapter for covering gaps in the drywall around the electrical box.

A further object of the present invention is to provide a strengthening adapter which has a peripheral rim creating a cradle for accepting a decorative cover plate.

A further object of the present invention is to provide a strengthening adapter which can secure a plurality of electrical devices that are next to each other within existing drywall.

The advantages of my invention wll become apparent from the study of the following description and the accompanying drawings and are not limited thereto.

DETAILED DESCRIPTION OF THE DRAWINGS

Figure 1:
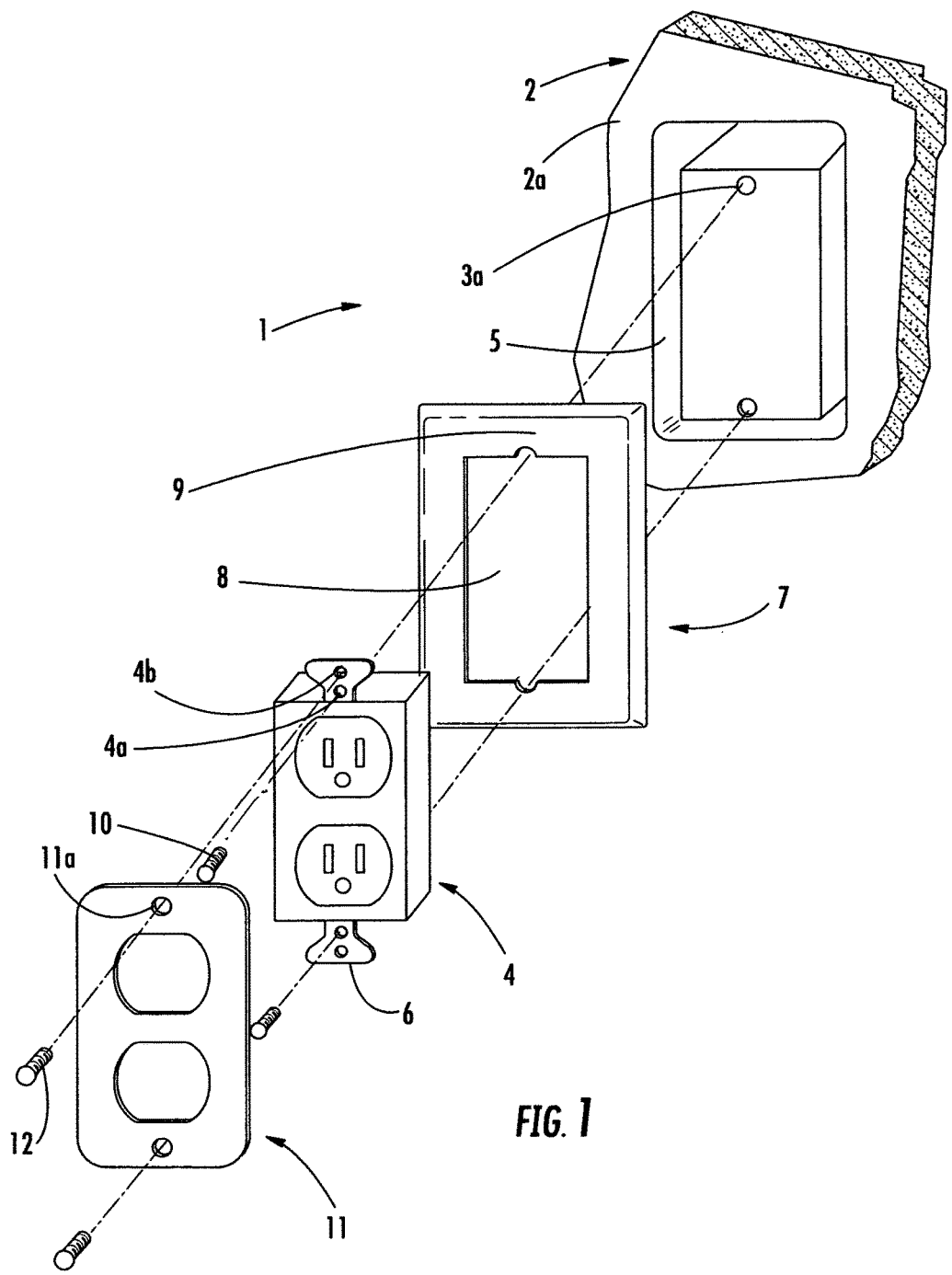
FIG. 1 is an exploded view of the strengthening bracket positioned to cover the space around the electrical box and securely and rigidly mount the electrical device to drywall.

FIG. 1 is an exploded view 1 of a standard electric device 4 connected to a standard electrical box 3 positioned within space in the drywall 2. The electrical box 3 has a pair of holes 3a capable of securing the electrical device 4 thereto via screws 10. The standard electrical device 4 can be a switch or a female receptacle both of which are well known in the prior art. The standard electrical device 4 has tabs 6 positioned at the top and bottom thereof. Within these tabs 6 are a first pair of holes 4a adapted to align with holes 3a on the electrical box 3. Also with said tabs 6 are a second pair of holes 4b adapted to align with holes 11a in cover plate 11. Strengthening adapter 7 of the present invention has a central opening 8 having a pair of vertical and horizontal edges and slots 9 formed therein at each horizontal edge of the central opening 8. The central opening 8 is sized to accept an electrical device 4 in such a manner that the tabs 6 do not pass through the central opening 8 but rests against the strengthening adapter 7. In operation an electrician positions the strengthening adapter 7 of the present invention against the outer side 2a of the drywall 2 in a manner which covers the space 5 around the electrical box 3 but allows passage of the electric device 4. He places the electrical device 4 in the central opening 8 formed in the strengthening adapter 7 and screws a first pair of screws 10 through the first pair of holes 4a into holes 3a in the electrical box 3 on the inner side of the drywall thereby rigidly sandwiching the strengthening adapter 7 between the tabs 6 of the electrical device 4 and the outer side 2a of the drywall 2. The electrician then places the decorative cover plate 11 having holes 11a over the electrical device 4 and the strengthening adapter 7 and uses a second pair of screws 12 to secure the cover plate 11 to the second pair of holes 4b in the electrical device 4 through the slots 9 in the strengthening adapter 7. Once the installation is complete the electrical device 4 is rigidly secured to the electrical box 3 and the space 5 in the drywall 2 around the electrical box 3 is covered. The strengthening adapter 7 can be injection molded using a thermoformed plastic such as Nylon, ABS or polypropylene, however and any manufacturing process and materials could be used as long as they adhere to the required engineered specifications.

Figure 2:
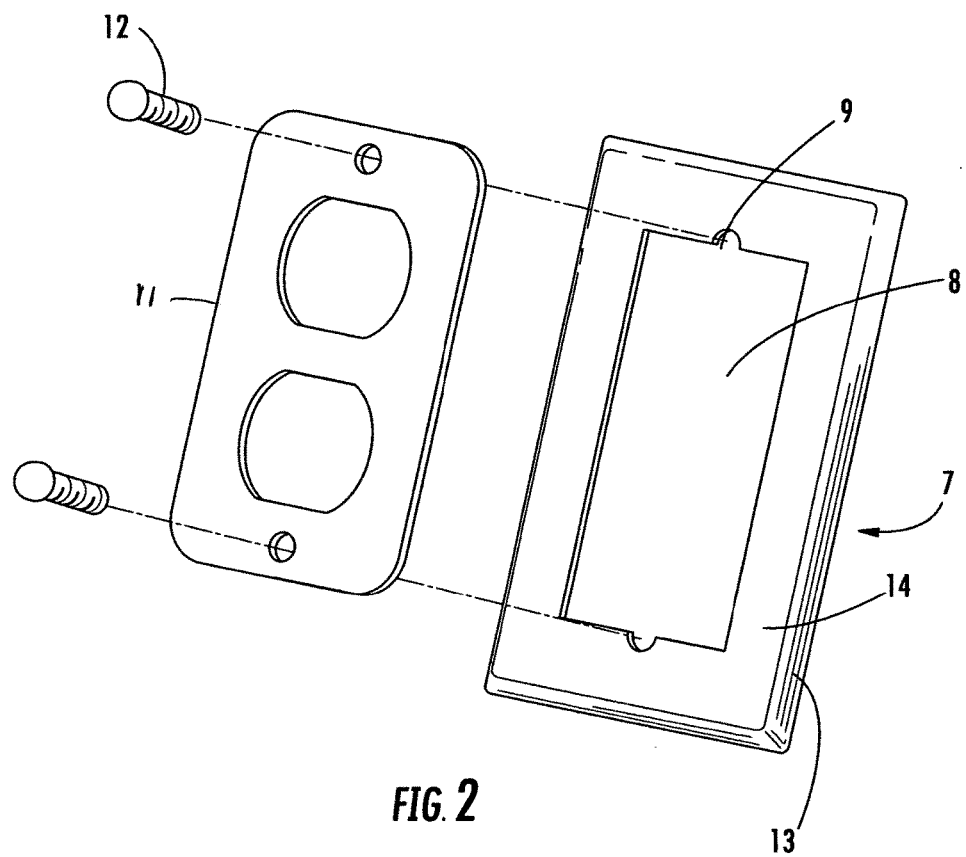
FIG. 2 shows the strengthening adapter having a peripheral rim for creating a cradle for accepting a cover plate.

FIG. 2 shows the strengthening adapter 7 having a raised rim 13 formed around the peripheral edge thereof. This rim 13 creates a cradle 14 for the acceptance of the cover plate 11. Either the cover plate 11 or the strengthening adapter 7 can be painted the same color or different colors. The cover plate 11 and the strengthening adapter 7 can be sold as a repair kit.

Figure 3:
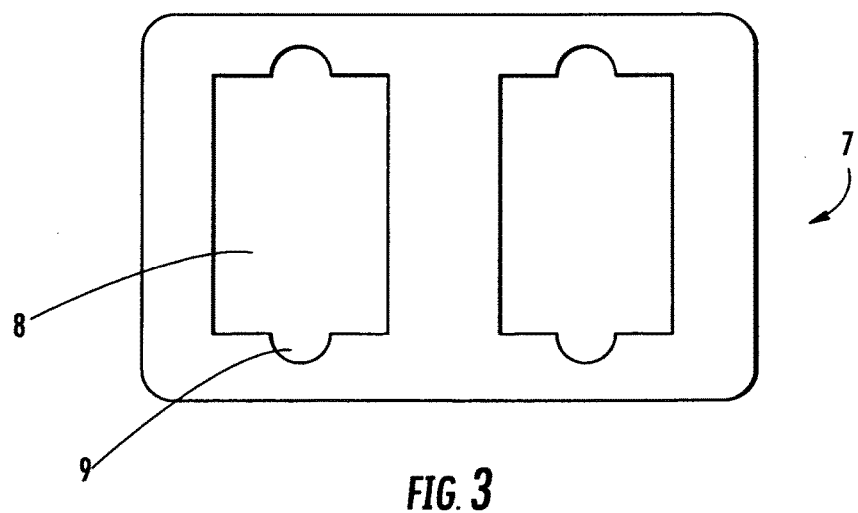
FIG. 3 shows the strengthening adapter designed for the situation wherein at least two electrical boxes are positioned next to each other.

FIG. 3 shows the strengthening adapter 7 having two central openings 8 being formed for two electrical boxes. It should be understood that the strengthening adapter 7 can be manufactured to accommodate a plurality of electrical boxes and the invention should not be limited to that illustrated herein. For example, the strengthening adapter 7 can be manufactured with three, four, five or more central openings.

The invention claimed is:

1. A method of securely fastening an electrical device to an electrical box positioned within an opening in drywall, and simultaneously coving any space around said electrical box, said drywall having an inner and outer side comprising:
    positioning said electrical box within said opening on the inner side of the drywall,
    positioning a strengthening adapter on the outer side of said drywall about said opening, said strengthening adapter being a flat planar member having a central opening therein and being sized to cover said opening in the drywall, said central opening having vertical and horizontal edges and having slots formed at both ends of the horizontal edges,
    positioning an electrical device within said central opening,
    screwing the electrical device into holes provided in the electrical box thereby forcibly sandwiching the strengthening adapter between the electrical device and the drywall outer side,
    providing a decorative cover plate,
    placing the decorative cover plate over the strengthening adapter and aligning holes in the cover plate with the slots in the strengthening adapter and holes in the electrical device,
    screwing the decorative cover plate into the holes in the electrical device though said slots in the strengthening adapter.

2. The method as set forth in claim 1, wherein the electrical device is a switch.

3. The method as set forth in claim 1, wherein the electrical device is a female receptacle.

4. The method as set forth in claim 1, wherein a peripheral rim is positioned about the strengthening adapter thereby creating a cradle for placement of the decorative cover plate therein.

5. The method as set forth in claim 1, wherein the electrical box is fastened to a stud onto which the inner side of the drywall is connected.

6. The method as set forth in claim 1, wherein the strengthening adapter has at least two central openings.

7. The method as set forth in claim 6, wherein the decorative plate is sized to cover the at least two central openings.

* * * * *